(12) United States Patent
Lin

(10) Patent No.: US 11,280,734 B2
(45) Date of Patent: Mar. 22, 2022

(54) OPTICAL DENSITY TESTING SYSTEM AND OPTICAL DENSITY TESTING DEVICE

(71) Applicant: TRIPLE WIN TECHNOLOGY(SHENZHEN) CO.LTD., Shenzhen (CN)

(72) Inventor: Yen-Sheng Lin, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 0 days.

(21) Appl. No.: 16/950,720

(22) Filed: Nov. 17, 2020

(65) Prior Publication Data

US 2021/0396671 A1 Dec. 23, 2021

(30) Foreign Application Priority Data

Jun. 22, 2020 (CN) .......................... 202010576013.9

(51) Int. Cl.
*G01N 21/59* (2006.01)

(52) U.S. Cl.
CPC . *G01N 21/5907* (2013.01); *G01N 2201/0631* (2013.01); *G01N 2201/0668* (2013.01); *G01N 2201/08* (2013.01)

(58) Field of Classification Search
CPC ....... G01N 21/5907; G01N 2201/0631; G01N 2201/0668; G01N 2201/08
See application file for complete search history.

*Primary Examiner* — Hina F Ayub
(74) *Attorney, Agent, or Firm* — ScienBiziP, P.C.

(57) ABSTRACT

An optical density testing system includes a light source, a first light splitting device used to divide the light into at least two light paths, at least two second light splitting devices used for receiving the at least two paths of light from the first light splitting device, first light-passing holes provided corresponding to each of the at least two second light splitting devices, a first filter device detachably arranged at each of the first light-passing holes, a first diaphragm detachably installed on each of the first filter devices, and a light receiving device. The second light splitting device is used to transmit the light onto a product to be tested through the first filter device and the first diaphragm. The light receiving device is used to receive transmitted light formed after the light passes through the product to be tested.

17 Claims, 11 Drawing Sheets

OPTICAL DENSITY TESTING SYSTEM AND OPTICAL DENSITY TESTING DEVICE

FIELD

The subject matter herein generally relates to an optical density testing system and an optical density testing device using the optical density testing system.

BACKGROUND

An optical density of an object is calculated by measuring a light intensity of a light and a light intensity of the light after passing through the object. Generally, an optical density testing device uses a single light source and a single probe, which can only measure one point at a time on the object; and can only test white light within a range of 300-800 nm, which cannot accurately simulate the test light source. Furthermore, for test points of different sizes, diaphragms of different aperture sizes are required to be replaced manually, which is troublesome.

BRIEF DESCRIPTION OF THE DRAWINGS

Implementations of the present disclosure will now be described, by way of embodiments, with reference to the attached figures.

DETAILED DESCRIPTION

Figure 1:
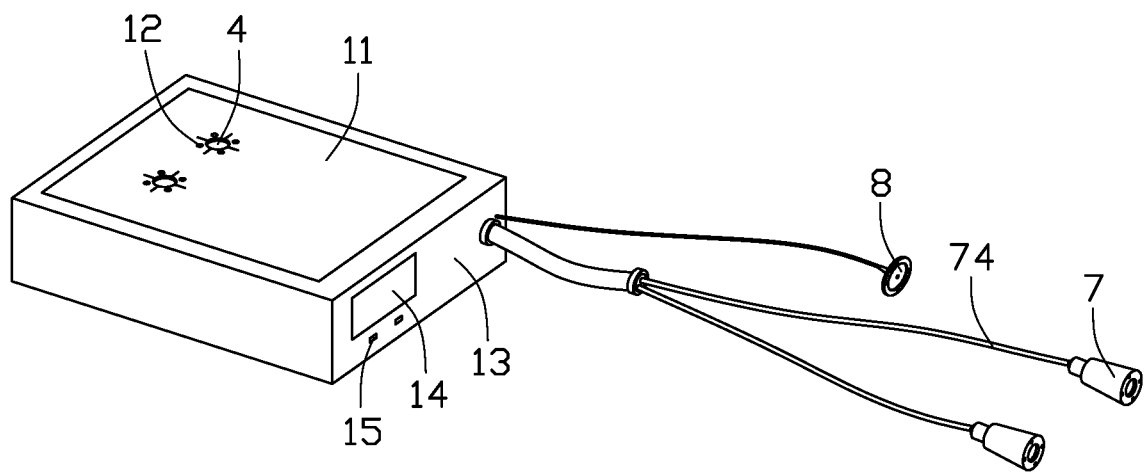
FIG. 1 is a schematic structural diagram of an optical density testing device according to an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIGS. 1-10 show an embodiment of an optical density testing system 100 including a light source 1, a first light splitting device 2 arranged on a light emission side of the light source 1, at least two second light splitting devices 3 cooperating with the first light splitting device 2, first light-passing holes 4 provided corresponding to each of the at least two second light splitting devices 3, respectively, a first filter device 5 detachably arranged at each of the first light-passing holes 4, a first diaphragm 6 detachably installed on each of the first filter devices 5, a light receiving device 7 cooperating with the first diaphragm 6, and a product 200 to be tested placed between the first light diaphragm 6 and the light receiving device 7.

The light source 1 is used to emit a light a. The first light splitting device 2 is used to divide the light a into at least two light paths and transmit the at least two paths of the light a to the corresponding second light splitting device 3. The second light splitting device 3 is used to irradiate the light a through the first light-passing hole 4, the first filter device 5, and the first diaphragm 6 onto the product 200 to be tested. The light receiving device 7 is used to receive transmitted light passing through the product 200 to be tested.

Figure 2:
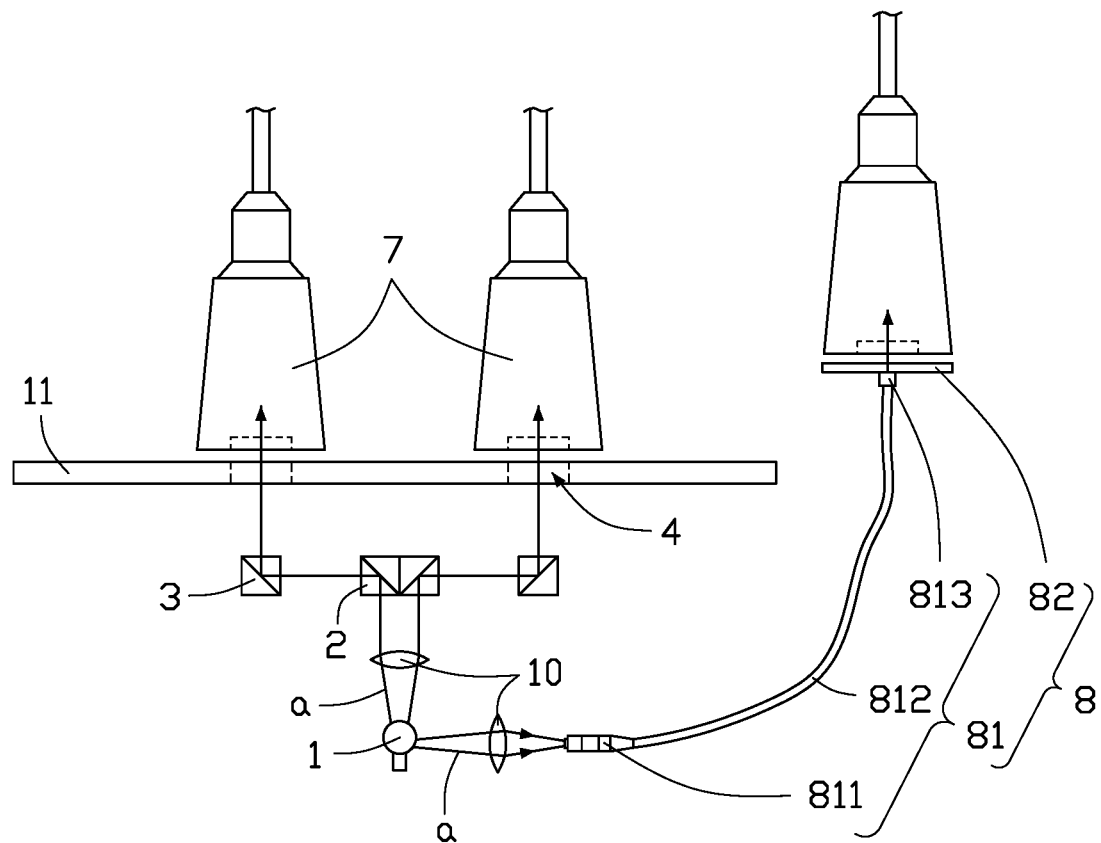
FIG. 2 is a schematic diagram of an optical density testing system provided by an embodiment of the present disclosure.

As shown in FIG. 2, a lens 10 is provided between the light source 1 and the first light splitting device 2 for focusing and transmitting the light a emitted by the light source 1 to the first light splitting device 2.

The first light splitting device 2 includes at least two first beam splitting prisms combined together. Each second light splitting device 3 includes a second beam splitting prism. The first beam splitting prisms and the second beam splitting prisms can completely reflect the light a. In one embodiment, the first light splitting device 2 is composed of two depolarizing beam splitting prisms (NPBS), which divide the light a emitted by the light source 1 into the two paths and change a transmission direction of the two paths by 90°. Then, each of the two paths enters the corresponding second light splitting device 3. Each of the second light splitting devices 3 is composed of a depolarizing beam splitting prism, and a transmission direction of each of the two paths is changed by 90° to enter through the corresponding first light-passing hole 4. In actual use, a number of paths that the first light splitting device 2 can split the light a into can be designed according to actual needs, so that multiple points of the product 200 to be tested can be measured at the same time to improve a testing efficiency.

Figure 3:
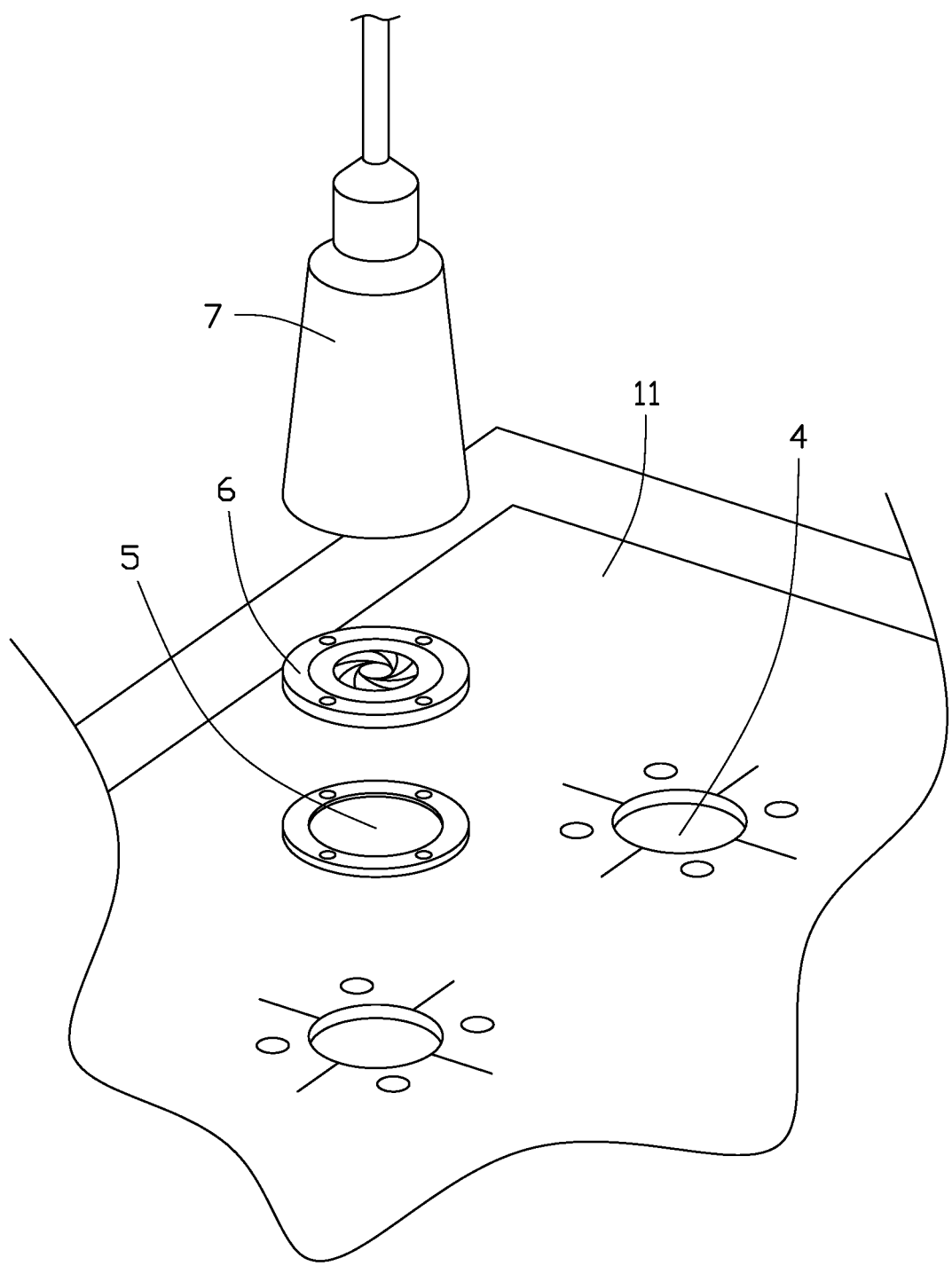
FIG. 3 is a structural diagram of a first light-passing hole, a first filter device, a first diaphragm, and a light receiving device.
Figure 4:
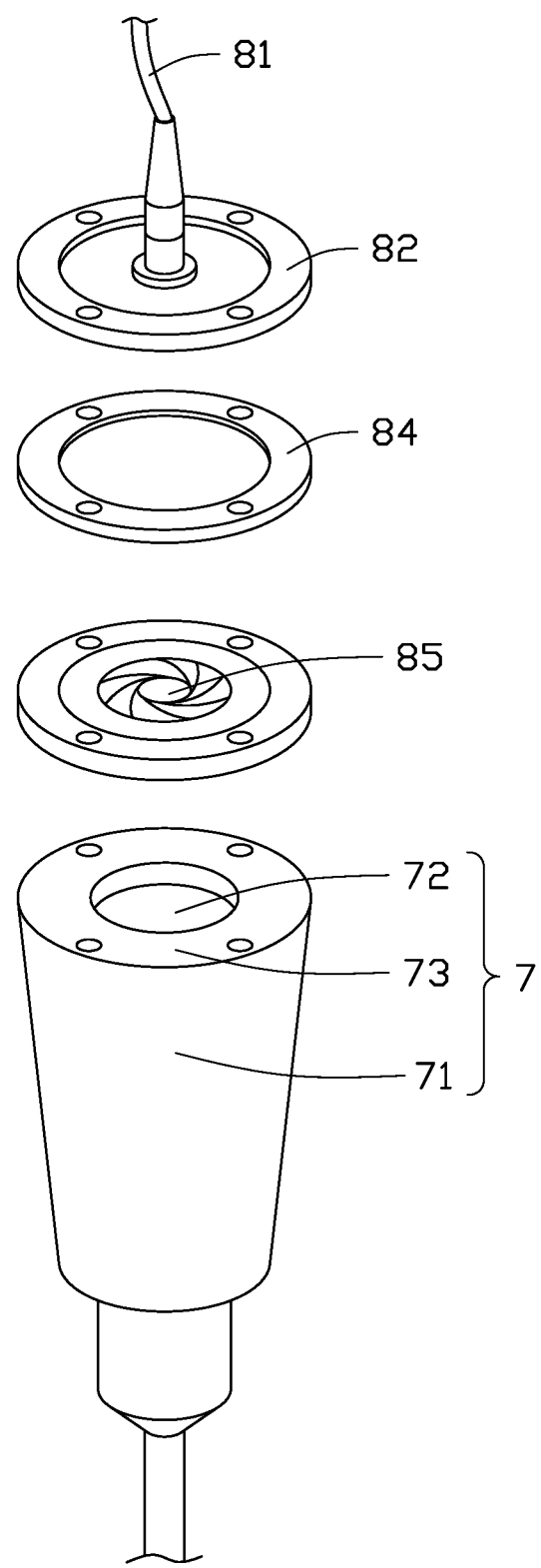
FIG. 4 is a structural diagram of an external light source and a light receiving device.
Figure 9:
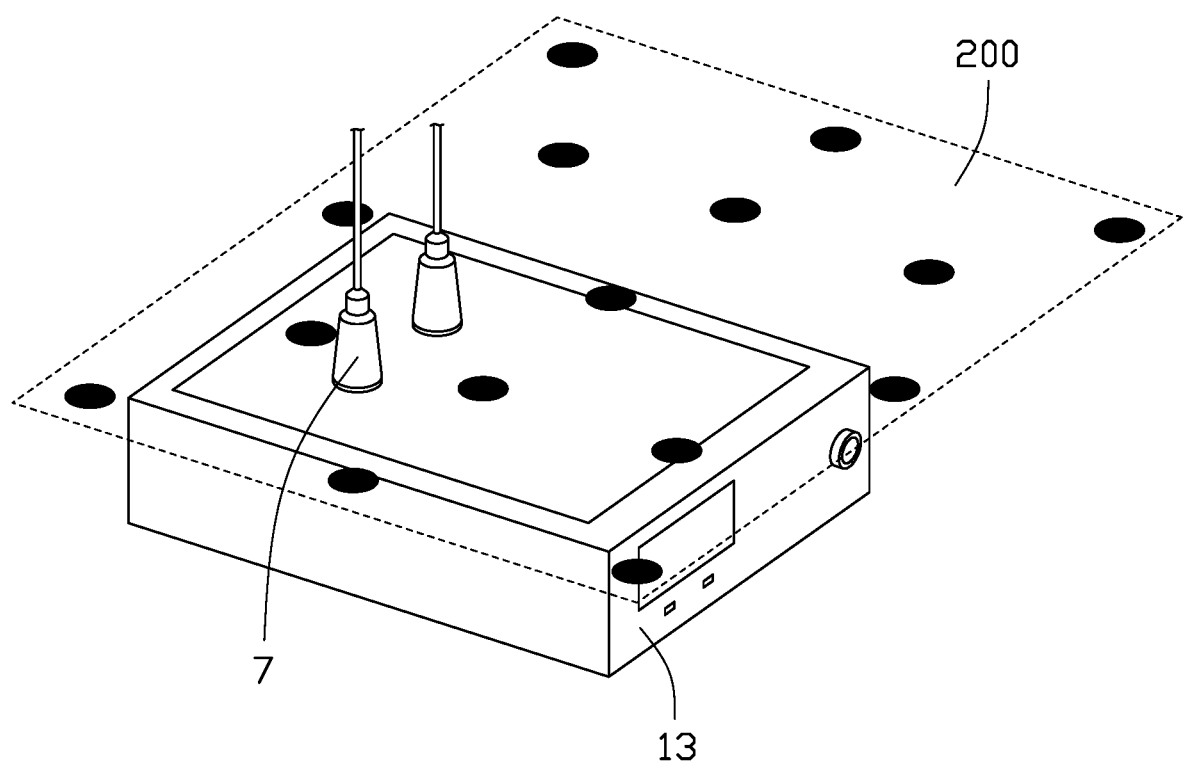
FIG. 9 is a structural diagram of the optical density testing device testing an optical density of a product.
Figure 10:
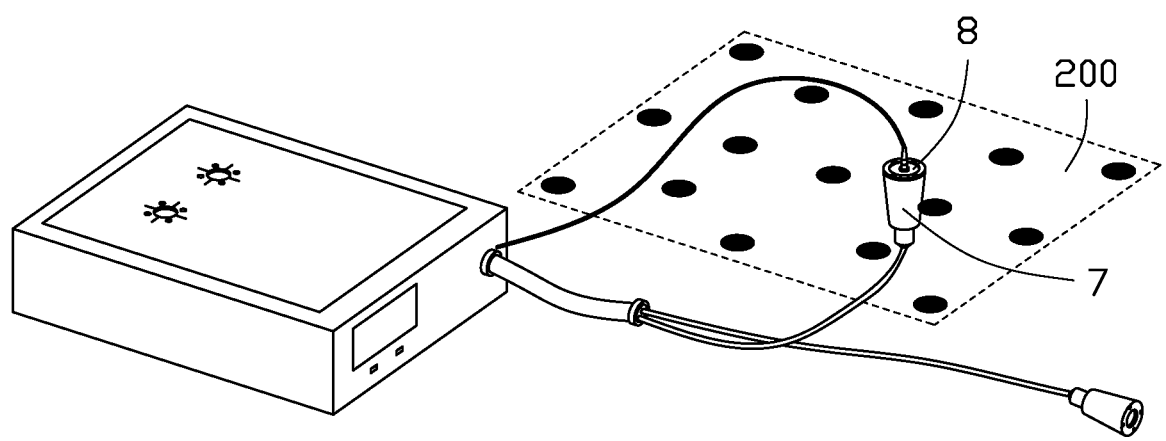
FIG. 10 is another structural diagram of the optical density testing device testing the optical density of the product.

As shown in FIGS. 1, 3, and 9, the first light-passing holes 4 are provided on a test platform 11, and a positioning device 12 is provided on the test platform 11 around each of the first light-passing holes 4 for detachably fixing the first filter devices 5. In one embodiment, the positioning device 12 is a magnet, and the magnet is embedded in a surface of the test platform 11 so that the magnet is flush with the surface of the test platform 11 and will not impact the product 200 to be tested. Two surfaces of the first filter device 5 and two surfaces of the first diaphragm 6 are also embedded with the positioning device 12, so that the first filter device 5 and the first diaphragm 6 can be disassembled and assembled conveniently and quickly.

Figure 6:
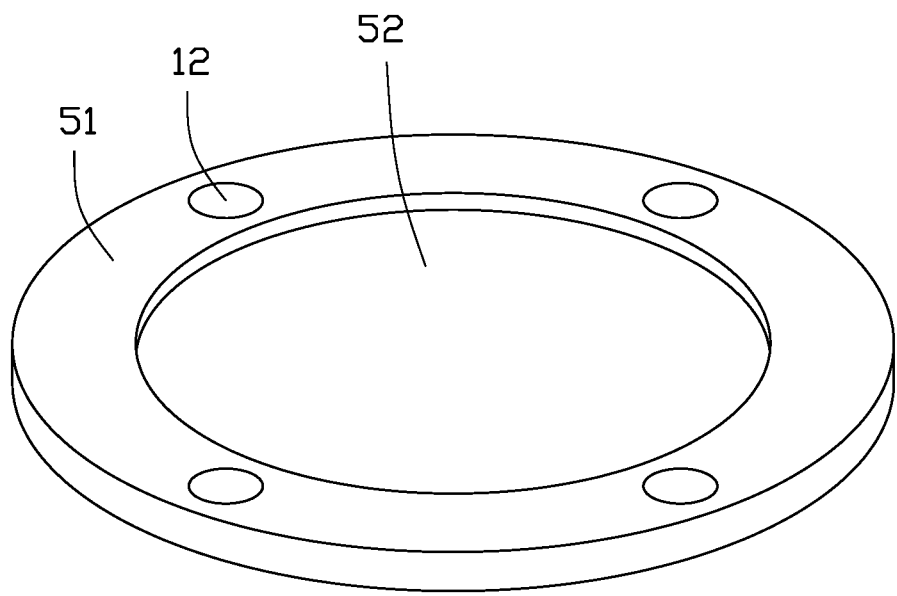
FIG. 6 is a structural diagram of the first filter device.
Figure 7:
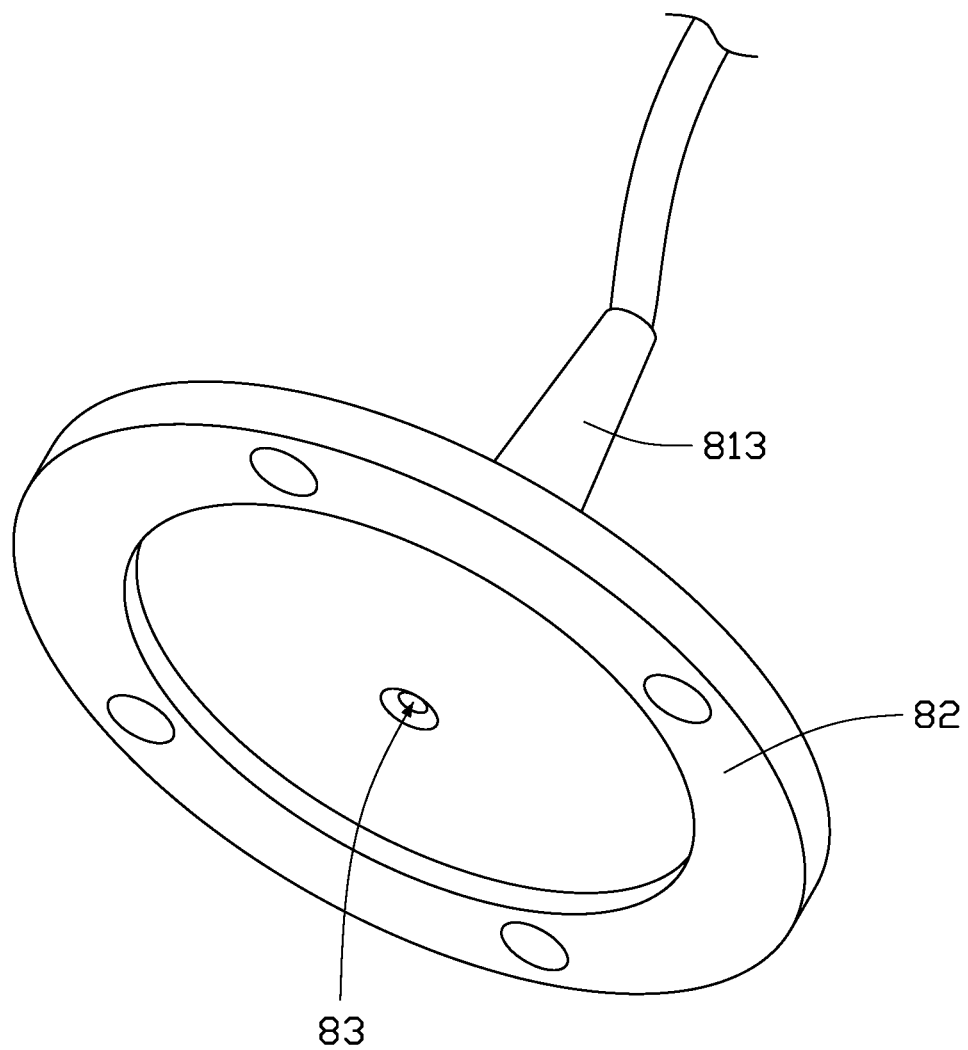
FIG. 7 is a structural diagram of the external light source.
Figure 8:
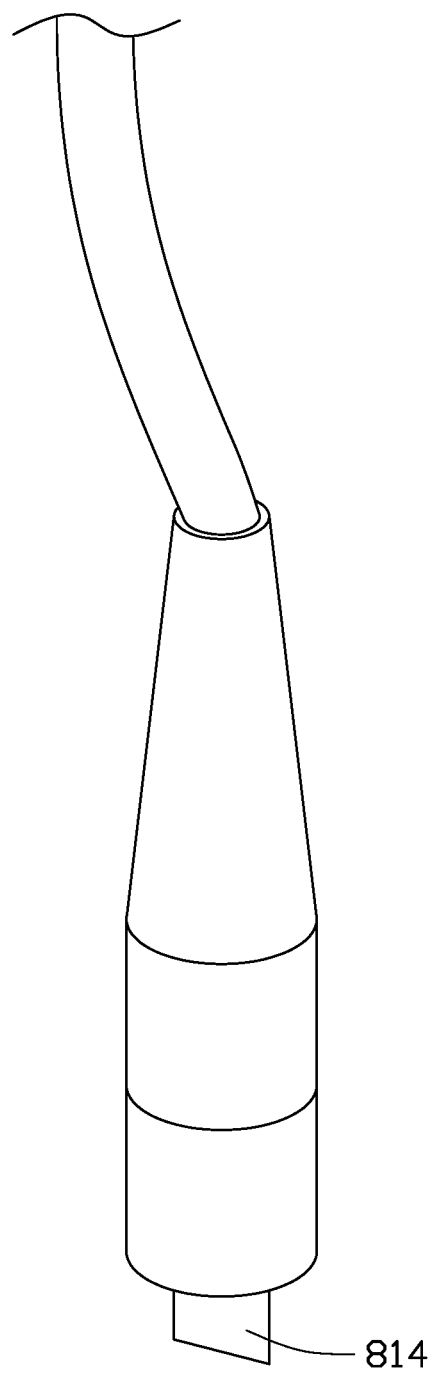
FIG. 8 is a structural diagram of a light output end of the external light source.

As shown in FIG. 6, the first filter device 5 includes a hollow fixed frame 51, a filter 52 provided in a hollow position of the fixed frame 51. The filter 52 can be matched with different first filter devices 5 to achieve the purpose of filtering different wavelengths of light to measure the light density at different wavelengths.

Figure 5:
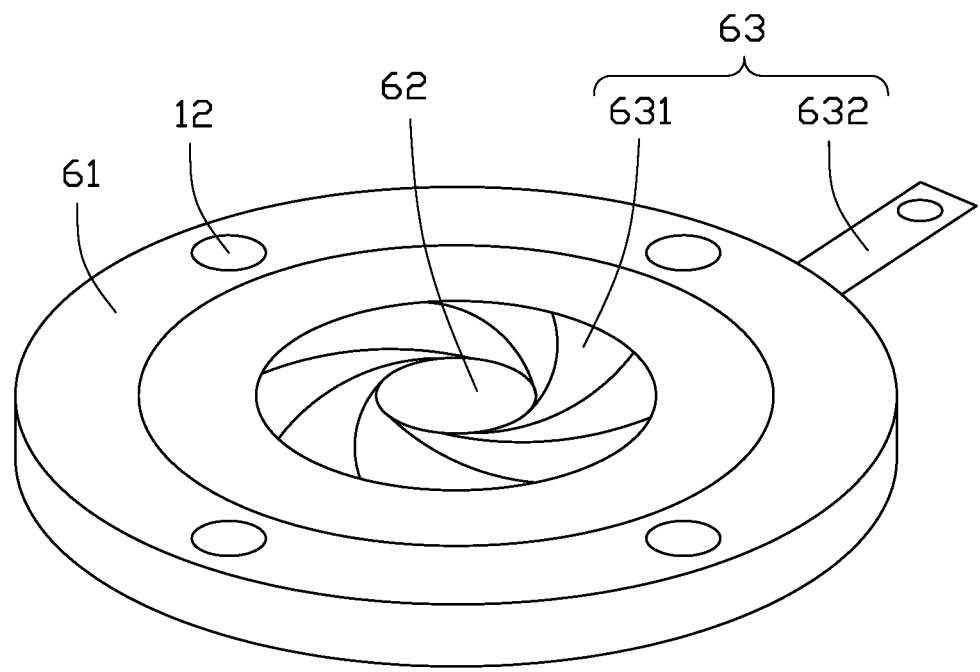
FIG. 5 is a structural diagram of the first diaphragm.

As shown in FIG. 5, the first diaphragm 6 includes a positioning disk 61, a through hole 62 provided in a middle portion of the positioning disk 61, and an aperture adjustment device 63 provided on a side wall of the through hole 62. The aperture adjustment device 63 is used to adjust an aperture size of the through hole 62.

In one embodiment, the aperture adjustment device 63 may adopt a mechanical shutter structure design. A groove (not shown) is provided in a middle of the positioning disk 61. An opening direction of the groove faces the through hole 62. The aperture adjustment device 63 is fixed in the groove. The aperture adjustment device 63 includes an adjusting device (not shown) fixed in the groove, a plurality of blades 631 arranged on the adjusting device, and an adjusting rod 632 arranged on a side of the adjusting device. The plurality of the blades 631 is located in the through hole 62 and can be combined to define a round hole in the middle. The adjusting rod 632 extends from the positioning disk 61 in a direction away from the through hole 62 and can move along a first direction substantially parallel to a surface of the positioning disk 61. The adjusting rod 632 is engaged with the adjusting device through gears for opening and closing the blades 631 to achieve the purpose of adjusting the aperture of the through hole 62, so that the same first diaphragm 6 can adjust the aperture size for different measurement points. Thus, there is no need to manually replace the first diaphragm 6 with another diaphragm of a different aperture size for different measurement points, which is convenient and does not require multiple diaphragms.

As shown in FIG. 3, in one embodiment, the through hole 62 is a circular through hole, a hollow portion of the fixing frame 51 is a circular through hole aligned with the through hole 62, and the first light-passing hole 4 is also a circular through hole aligned with the through hole 62 and the hollow portion of the fixing frame 51 to facilitate light transmission. At the same time, rubber buffer layers are provided on upper and lower surfaces of the fixed frame 51 and the positioning disk 61 to buffer contact with the product 200 to be tested. The rubber buffer layers can also be replaced by other soft materials.

As shown in FIGS. 3, 4, 9, and 10, the light receiving device 7 includes a sleeve 71, a light receiver 72 arranged in the sleeve 71, and a light blocking layer 73 arranged in the sleeve 71 adjacent to the first diaphragm 6. The light receiver 72 is embedded in the sleeve 71 a certain distance from an edge of the sleeve 71 to prevent external light from affecting light received from the product 200 to be tested. In one embodiment, the light blocking layer 73 is a black rubber buffer layer, which can prevent external light from entering the sleeve 71 and buffer contact with a surface of the product 200 to be tested. An outer ring of the sleeve 71 is also provided with the positioning device 12. The positioning device 12 is a magnet embedded in the sleeve 71 and will not cause damage to the product 200 to be tested.

As shown in FIG. 1, in one embodiment, the light receiving device 7 further includes a transmission line 74 to establish a communication connection with a optical density testing device 13. The transmission line 74 may be an optical fiber or other optical transmission material. The transmission line 74 can be freely bent, and a length of the transmission line 74 can be designed according to actual needs. A size of the product 200 to be tested may not be limited, and the optical density of large objects can be measured. At the same time, only one communication interface can be provided on the optical density testing device 13, and multiple light receiving devices 7 can be connected to the optical density testing device 13 through an adapter.

As shown in FIGS. 1, 2, 4, 7, 8, and 10, when it is necessary to test the optical density of a large-sized product 200, the optical density testing system 100 further includes an external light source 8. The external light source 8 includes a light transmission device 81 coupled to an optical path of the light source 1, a fixing device 82 provided at an end of the light transmission device 81 away from the light source 1, a second light-passing hole 83 provided on the fixing device 82, a second filter device 84 detachably provided at the second light-passing hole 83, and a second diaphragm 85 detachably provided on the second filter device 84. The light receiving device 7 can be arranged on a light exit side of the second diaphragm 85. The light source 1 emits the light a through the second light-passing hole 83, the second filter device 84, and the second diaphragm 85, and the light a enters the product 200 to be tested. Transmitted light formed by the light a passing through the product 200 to be tested is received by the light receiving device 7. Thus, the external light source 8 can realize the optical density testing of a large-sized product 200.

In one embodiment, the second filter device 84 and the first filter device 5 have a same structure, and the second diaphragm 85 and the first diaphragm 6 have a same structure.

In one embodiment, the light transmission device 81 includes a light receiving end 811, a transmission optical fiber 812, and a light output end 813. The light receiving end 811 is configured to receive the light a of the light source 1, and the light output end 813 is used to output the light a. The lens 10 is provided between the light receiving end 811 and the light source 1 for focusing the light a emitted by the light source 1 to the light receiving end 811. In one embodiment, the transmission optical fiber 812 is a hose-clad optical fiber, and the light a from the light source 1 is focused in the transmission optical fiber 812 through the lens 10. The light a is totally reflected and transmitted with low loss. The transmission optical fiber 812 can also be replaced by other light transmission materials. The light output end 813 includes a light outlet 814. The light outlet 814 is designed with a certain oblique angle, and the light outlet 814 is chamfered to prevent damage to the light source 1 caused by the reflection of the optical fiber. In one embodiment, the fixing device 82 is a flange, and the light output end 813 is aligned with the second light-passing hole 83 on the flange, which is convenient for connection. The fixing device 82, the second filter device 84, and the second diaphragm 85 are all fixed together by a detachable connection device, such as an embedded magnet.

As shown in FIG. 1, the optical density testing device 13 is used to obtain a light intensity of the light a. The optical density testing device 13 includes the above-mentioned optical density testing system 100. The optical density testing device 13 is also used to receive the transmitted light output by the light receiving device 7 and determine the light intensity of the transmitted light, and then according to the light intensity of the light a and the light intensity of the transmitted light, determine the optical density of the product 200. The optical density testing device 13 also includes a display screen 14 and an adjustment button 15. The display screen 14 and the adjustment button 15 are both communicatively coupled to the optical density testing device 13. The display screen 14 is used to display a test result. The adjustment button 15 switches information displayed on the display screen 14.

Figure 11:
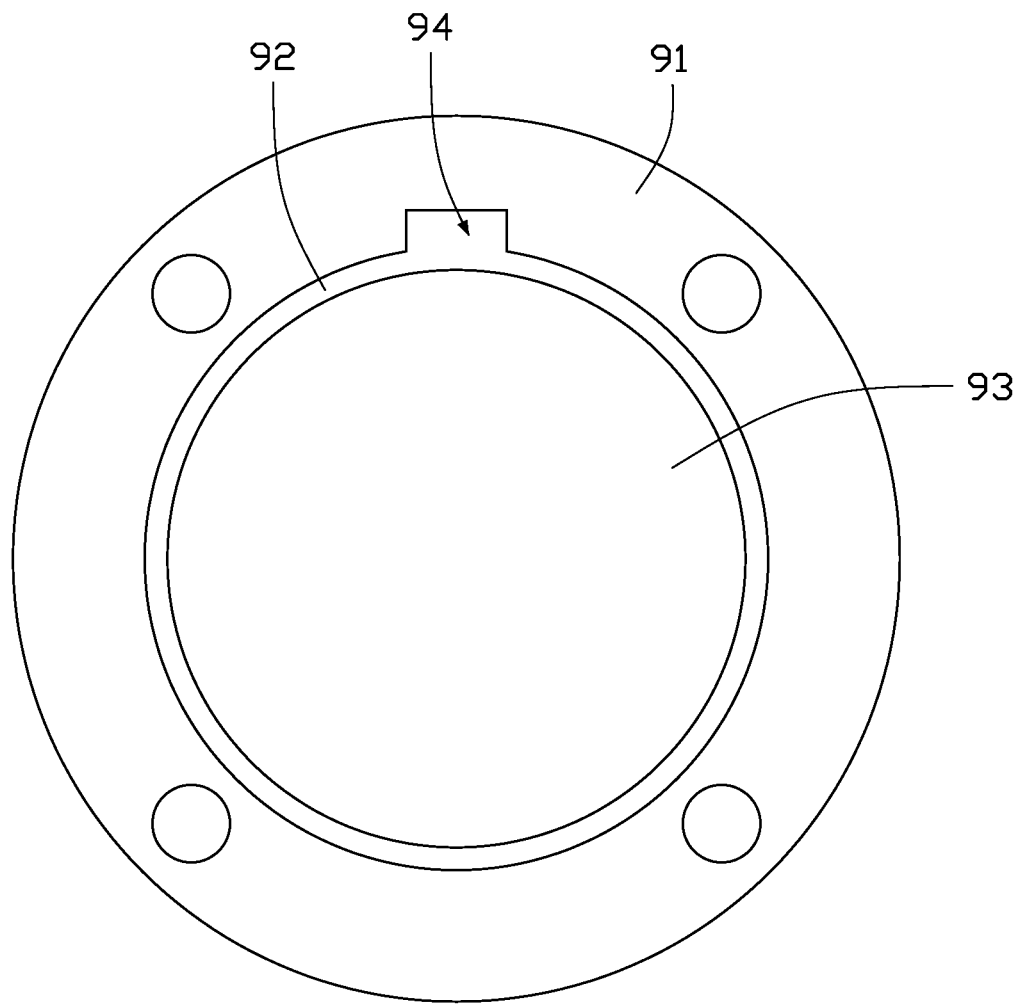
FIG. 11 is a structural diagram of the first filter device according to another embodiment of the present disclosure.

FIG. 11 shows another embodiment of a first filter device 9. The first filter device 9 includes a hollow fixed frame 91, a step 92 provided on an inner side of the fixed frame 91, an opening 94 provided on the step 92, and a filter 93 detachably provided on the step 92. The opening 94 is defined on a side wall of the step 92 and extends toward an outer edge of the fixed frame 91. In one embodiment, by designing the filter 93 to be detachable, there is no need to design multiple fixing frames 91, and only a different filter 93 needs to be replaced, which saves costs and facilitates storage. Specifically, the filter 93 can be pasted onto the step 92 to facilitate disassembly and assembly. At the same time, the design of the step 92 does not allow the filter 93 to protrude from the surface of the fixed frame 91 to damage the product 200, and the opening 94 can facilitate disassembly and assembly of the filter 93.

Compared with the related art, the optical density testing system 100 provided by the present disclosure has the following beneficial effects:

1. After the light emitted by the light source is focused by the lens, it can be divided into multiple paths through the first light splitting device, and then with the second light splitting device, the purpose of simultaneous testing of multiple points on the product to be tested can be achieved.

2. The detachable filter device can meet the measurement requirements of optical density at different wavelengths by changing different filter devices and improve accuracy.

3. The detachable diaphragm is easy to use, and the size of the aperture can be adjusted to adapt to the size of a point to be tested, thereby meeting the test requirements of different points to be tested.

4. By setting up an external light source, the external light source and the original light receiving device cooperate with each other, so that a large-sized product can be tested.

5. The light receiving device can be bent freely without space constraints, and can measure large objects to be tested.

6. The light transmission material adopts an optical fiber having stable light output and low loss.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An optical density testing system comprising:
    a light source used to emit light;
    a first light splitting device arranged on a light emission side of the light source, the first light splitting device used to divide the light into at least two light paths;
    at least two second light splitting devices used for receiving the at least two paths of light from the first light splitting device, respectively;
    first light-passing holes provided corresponding to each of the at least two second light splitting devices, respectively;
    a first filter device detachably arranged at each of the first light-passing holes;
    a first diaphragm detachably installed on each of the first filter devices; and
    a light receiving device cooperating with each of the first diaphragms; wherein:
    a product to be tested is placed between the first light diaphragm and the light receiving device;
    the second light splitting device is used to transmit the light onto the product to be tested through the first filter device and the first diaphragm;
    the light receiving device is used to receive transmitted light formed after the light passes through the product to be tested.

2. The optical density testing system of claim 1, wherein:
    the first beam splitting device and the second beam splitting device cause the light to be totally reflected.

3. The optical density testing system of claim 1, further comprising an external light source device comprising:
    a light transmission device coupled to an optical path of the light source;
    a fixing device provided at an end of the light transmission device away from the light source;
    a second light-passing hole provided on the fixing device;
    a second filter device detachably provided at the second light-passing hole; and
    a second diaphragm detachably provided on the second filter device; wherein:
    the light receiving device is arranged on a light exit side of the second diaphragm;
    the light source emits the light through the second light-passing hole, the second filter device, and the second diaphragm, and the light enters the product to be tested; and
    transmitted light formed by the light passing through the product to be tested is received by the light receiving device.

4. The optical density testing system of claim 3, wherein:
    the light transmission device comprises a light receiving end, a transmission optical fiber, and a light output end; and
    the light receiving end is configured to receive the light of the light source, and the light output end is used to output the light.

5. The optical density testing system of claim 4, wherein:
    the light output end comprises a light outlet; and
    an end surface of the light outlet is an inclined surface.

6. The optical density testing system of claim 3, wherein:
    a lens is provided between the light source and the first beam splitting device and between the light source and the light transmission device.

7. The optical density testing system of claim 1, wherein:
    the first diaphragm comprises a positioning disk, a through hole provided in a middle portion of the positioning disk, and an aperture adjustment device provided on a side wall of the through hole; and
    the aperture adjustment device is used to adjust an aperture size of the through hole.

8. The optical density testing system of claim 7, wherein:
    the aperture adjustment device comprises a plurality of blades and an adjusting rod;

the plurality of blades is located in a middle of the positioning disk and cooperatively defines a through hole in the middle of the positioning disk;

the adjusting rod extends from the positioning disk in a direction away from the through hole and can move along a first direction parallel to a surface of the positioning disk; and the adjusting rod is used for opening and closing the blades to achieve the purpose of adjusting an aperture of the through hole.

9. An optical density testing device comprising an optical density testing system and configured to obtain a light intensity of transmitted light passing through a product to be tested to determine an optical density of the product, the optical density testing system comprising:

a light source used to emit light;

a first light splitting device arranged on a light emission side of the light source, the first light splitting device used to divide the light into at least two light paths;

at least two second light splitting devices used for receiving the at least two paths of light from the first light splitting device, respectively;

first light-passing holes provided corresponding to each of the at least two second light splitting devices, respectively;

a first filter device detachably arranged at each of the first light-passing holes;

a first diaphragm detachably installed on each of the first filter devices; and a light receiving device cooperating with each of the first diaphragms; wherein:

a product to be tested is placed between the first light diaphragm and the light receiving device;

the second light splitting device is used to transmit the light onto the product to be tested through the first filter device and the first diaphragm;

the light receiving device is used to receive transmitted light formed after the light passes through the product to be tested.

10. The optical density testing device of claim 9, wherein:

the first beam splitting device and the second beam splitting device cause the light to be totally reflected.

11. The optical density testing device of claim 10, further comprising an external light source device comprising:

a light transmission device coupled to an optical path of the light source;

a fixing device provided at an end of the light transmission device away from the light source;

a second light-passing hole provided on the fixing device;

a second filter device detachably provided at the second light-passing hole; and a second diaphragm detachably provided on the second filter device; wherein:

the light receiving device is arranged on a light exit side of the second diaphragm;

the light source emits the light through the second light-passing hole, the second filter device, and the second diaphragm, and the light enters the product to be tested; and transmitted light formed by the light passing through the product to be tested is received by the light receiving device.

12. The optical density testing device of claim 11, wherein:

the light transmission device comprises a light receiving end, a transmission optical fiber, and a light output end; and the light receiving end is configured to receive the light of the light source, and the light output end is used to output the light.

13. The optical density testing device of claim 12, wherein:

the light output end comprises a light outlet; and an end surface of the light outlet is an inclined surface.

14. The optical density testing device of claim 13, wherein:

the first diaphragm comprises a positioning disk, a through hole provided in a middle portion of the positioning disk, and an aperture adjustment device provided on a side wall of the through hole; and the aperture adjustment device is used to adjust an aperture size of the through hole.

15. The optical density testing device of claim 14, wherein:

the aperture adjustment device comprises a plurality of blades and an adjusting rod;

the plurality of blades is located in a middle of the positioning disk and cooperatively defines a through hole in the middle of the positioning disk;

the adjusting rod extends from the positioning disk in a direction away from the through hole and can move along a first direction parallel to a surface of the positioning disk; and the adjusting rod is used for opening and closing the blades to achieve the purpose of adjusting an aperture of the through hole.

16. The optical density testing device of claim 15, wherein:

a lens is provided between the light source and the first beam splitting device and between the light source and the light transmission device.

17. The optical density testing device of claim 9, further comprising a display screen and an adjustment button, wherein:

the display screen is used to display the optical density of the product.

* * * * *